Dec. 31, 1935.    G. F. SCHLOTE    2,026,142
AUTOMATIC TRANSMISSION MECHANISM
Filed Dec. 28, 1933    9 Sheets-Sheet 1

Inventor
G. F. Schlote.
By
Attorney

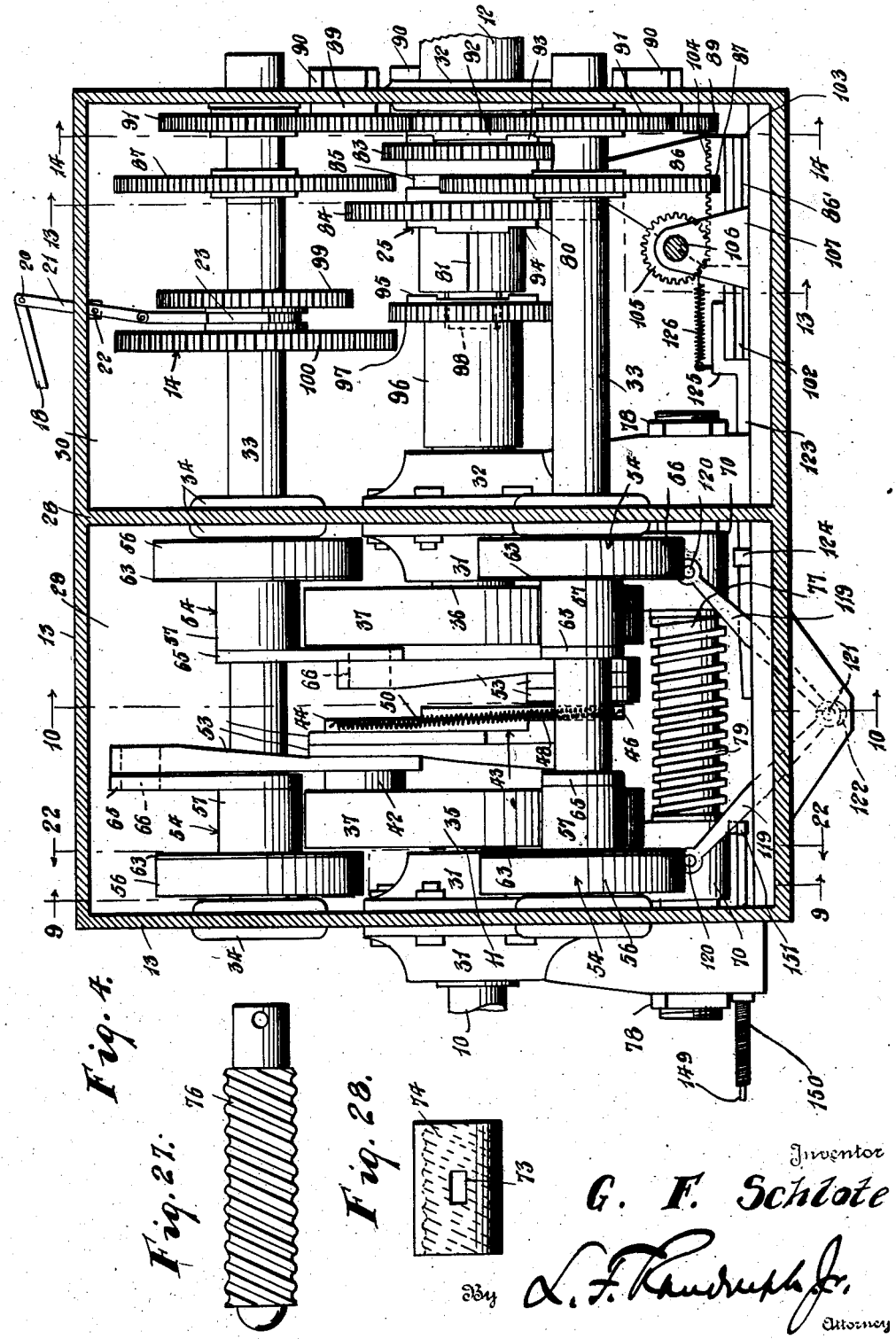

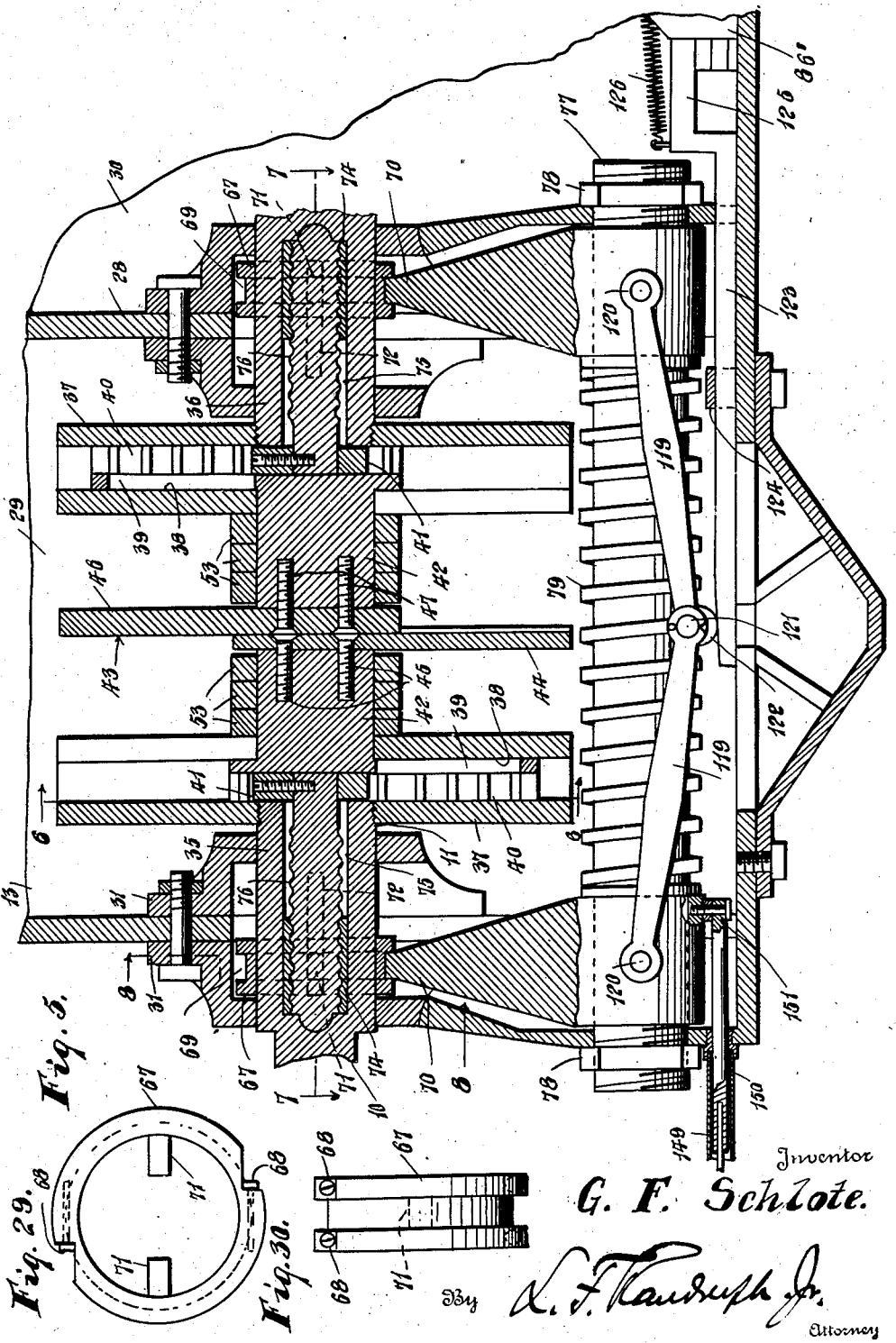

Dec. 31, 1935. G. F. SCHLOTE 2,026,142
AUTOMATIC TRANSMISSION MECHANISM
Filed Dec. 28, 1933 9 Sheets-Sheet 4
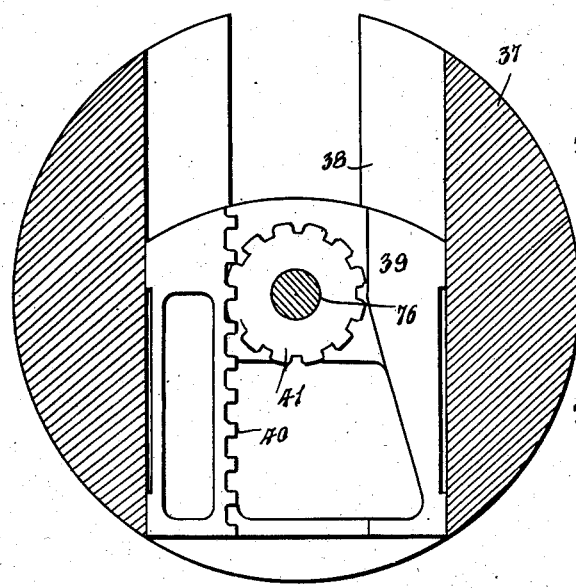
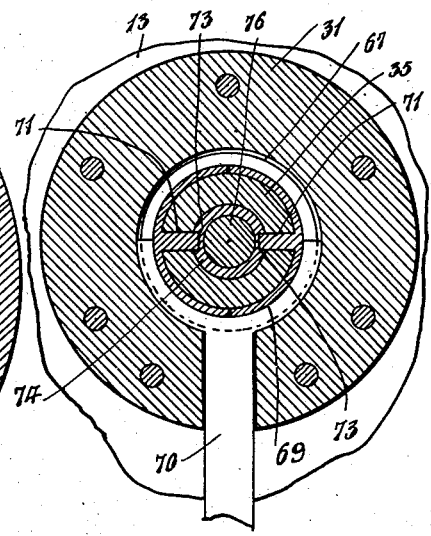
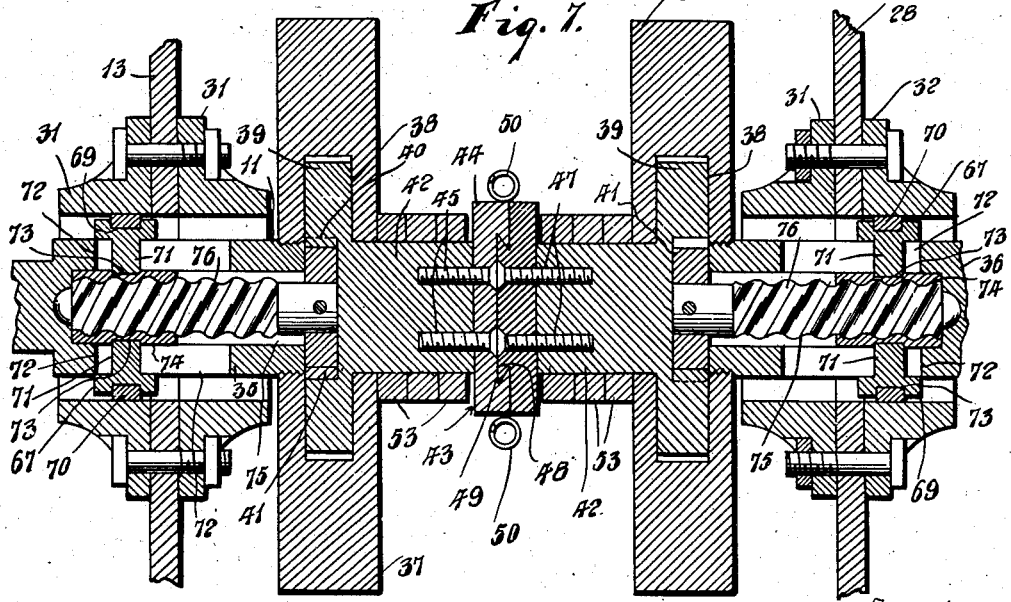

Dec. 31, 1935.  G. F. SCHLOTE  2,026,142
AUTOMATIC TRANSMISSION MECHANISM
Filed Dec. 28, 1933  9 Sheets-Sheet 5
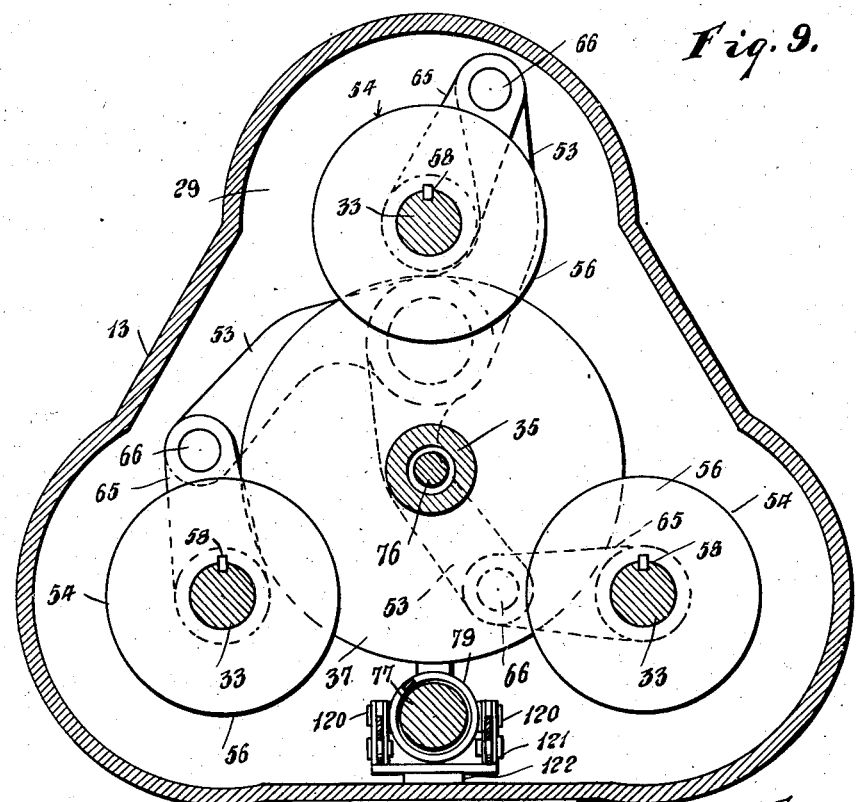
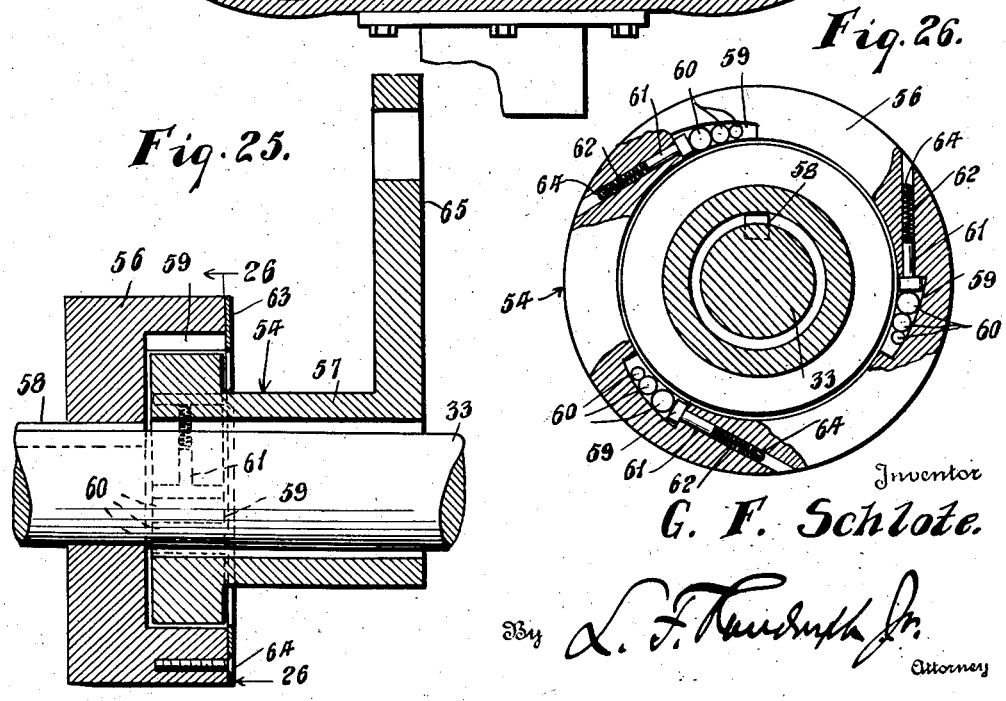

Dec. 31, 1935.  G. F. SCHLOTE  2,026,142

AUTOMATIC TRANSMISSION MECHANISM

Filed Dec. 28, 1933  9 Sheets-Sheet 6

Inventor
G. F. Schlote.
By L. F. Randolph Jr.
Attorney

Dec. 31, 1935.  G. F. SCHLOTE  2,026,142
AUTOMATIC TRANSMISSION MECHANISM
Filed Dec. 28, 1933  9 Sheets-Sheet 7
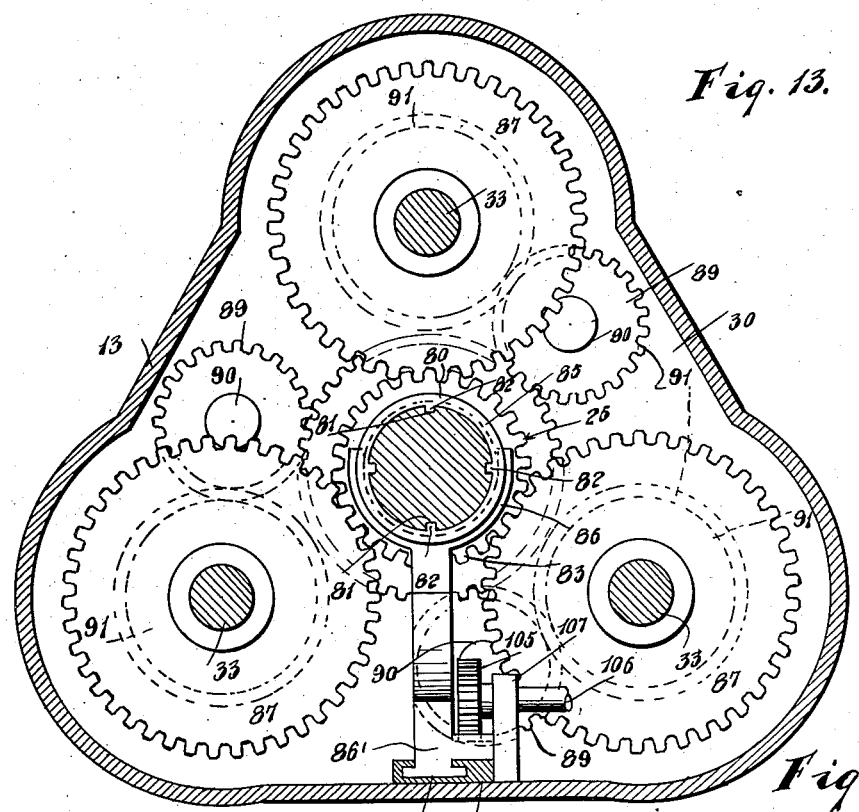
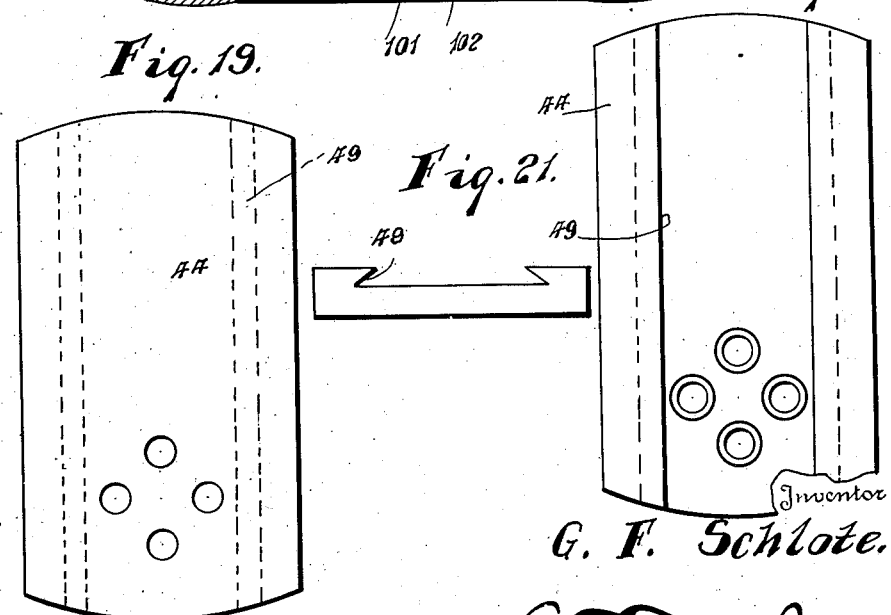
G. F. Schlote.

Dec. 31, 1935.   G. F. SCHLOTE   2,026,142
AUTOMATIC TRANSMISSION MECHANISM
Filed Dec. 28, 1933   9 Sheets-Sheet 8
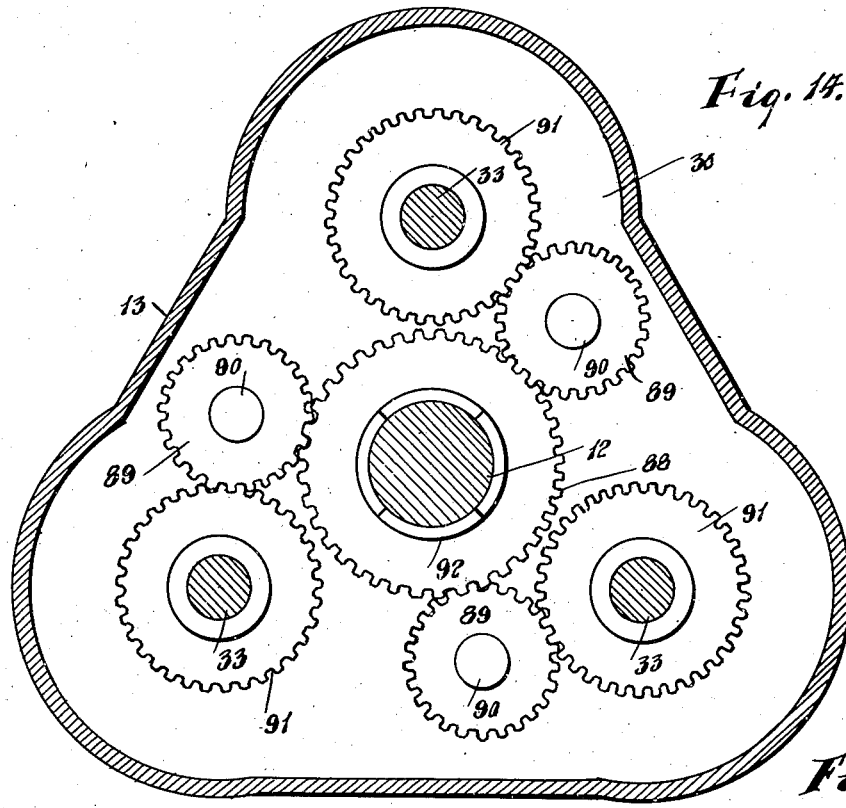
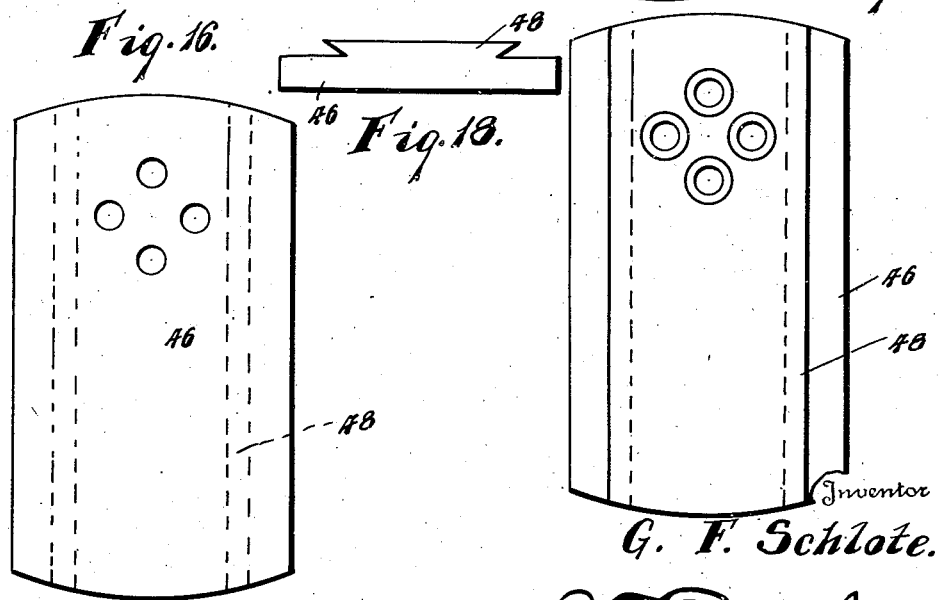
G. F. Schlote.

Dec. 31, 1935.  G. F. SCHLOTE  2,026,142
AUTOMATIC TRANSMISSION MECHANISM
Filed Dec. 28, 1933  9 Sheets-Sheet 9

Inventor
G. F. Schlote.
By L. F. Randolph Jr.
Attorney.

Patented Dec. 31, 1935

2,026,142

UNITED STATES PATENT OFFICE 2,026,142

AUTOMATIC TRANSMISSION MECHANISM

Guido F. Schlote, Ogden, Utah, assignor to The Automatic Power Transmission Company, a corporation of Utah Application December 28, 1933, Serial No. 704,334

13 Claims. (Cl. 74—114)

This invention relates to mechanism for automatically transmitting power primarily but not necessarily in self-propelled vehicles, after manual starting of the propelling motor of the vehicle, and it aims to provide a novel combination clutch and transmission mechanism adapted to replace the present transmission and clutch, being connected to the crank shaft of the engine or preferably between the engine and the differential or rear wheel drive.

A second object is to provide a novel mechanism which will automatically select the proper gear or provide the proper gear ratio for the engine, with respect to the driven wheel of the vehicle in order to produce the greatest efficiency in motive power.

A third object is to provide a novel construction of the character set forth wherein control is effected by means of parts operating through centrifugal force, to vary the speed of the vehicle being propelled.

A fourth object is to provide in such a device, clutch means coacting with the overrunning clutch means coacting with the crank shaft or equivalent for transmitting motion at various speeds in the same direction as the direction of work.

A fifth object of the invention is to provide a part of the main shaft in sections, each section having a fly wheel thereon equipped with governors to operatively connect such fly wheels with respective propeller shafts, together with means for holding the governors at the center of their respective fly wheels.

A sixth object is to provide a novel mechanism which completely eliminates the necessity of manually shifting gears in a transmission for varying the speed of the vehicle in a forward direction, centrifugal force developed by the speed of the crank shaft being used to accomplish the novel result, eliminating noise and discomfort incidental to shifting of gears, and wear on working parts of a clutch.

A seventh object is to provide an improved device of the character set forth which will afford the driver of the vehicle a practically unlimited field of control of power to speed, or power to waste, thus not restricting the driver to a low, medium or high driving range as in present transmissions.

Another object is to provide a device of the character mentioned having an indicator or meter, disposed preferably on the instrument board of the vehicle, to indicate the ratio of gear the vehicle is traveling in, or to indicate the proportionate relationship in revolutions per minute of crank shaft to drive shaft of the vehicle, depending on the weight of the load or amount of resistance the inertia of the load of the vehicle offers, and other interesting and desirable data for the driver.

It is also aimed to provide a construction which is durable, practical, efficient, and relatively simple and inexpensive.

Various additional objects and advantages will become apparent from a consideration of the description following taken in connection with accompanying drawings illustrating an operative embodiment.

In said drawings:—

Figure 4 is an enlarged view of the major portion of my improvement, the housing or casing being broken away or shown in section to disclose details;

Figure 5 is an enlarged substantially central longitudinal section view, through part of the improved apparatus, particularly that controlled and operated by the governors;

Figure 6 is a cross sectional view taken on the line 6—6 of Figure 5;

Figure 7 is a longitudinal sectional view taken on the line 7—7 of Figure 5;

Figure 8 is a cross sectional view taken on the line 8—8 of Figure 5;

Figure 9 is a cross sectional view taken on the line 9—9 of Figure 4;

Figure 13 is a cross sectional view taken on the line 13—13 of Figure 4;

Figure 14 is a cross sectional view taken on the line 14—14 of Figure 4;

Figure 15 is a cross sectional view through the meter taken on the line 15—15 of Figure 3;

Figures 16 and 17 are elevations of reverse sides of one of the sections of the coupling used between the main shaft sections adjacent the fly wheels;

Figure 18 is an end view of the sections of Figures 16 and 17;

Figures 19 and 20 are reverse elevations of the complemental coupling section to that of Figures 16 to 18;

Figure 21 is an end view of the coupling section of Figures 19 and 20;

Figure 25 is a detail longitudinal sectional view taken through one of the overrunning clutches;

Figure 26 is a sectional view taken on the line 26—26 of Figure 25;

Figure 27 is a longitudinal sectional view taken through the governor-operated worm or screw;

Figure 28 is a longitudinal sectional view through the sleeve operated by said screw of Figure 27;

Figure 29 is a side elevation of the worm or screw-control collar; and

Figure 30 is an edge elevation of the collar of Figure 29.

Figure 1:
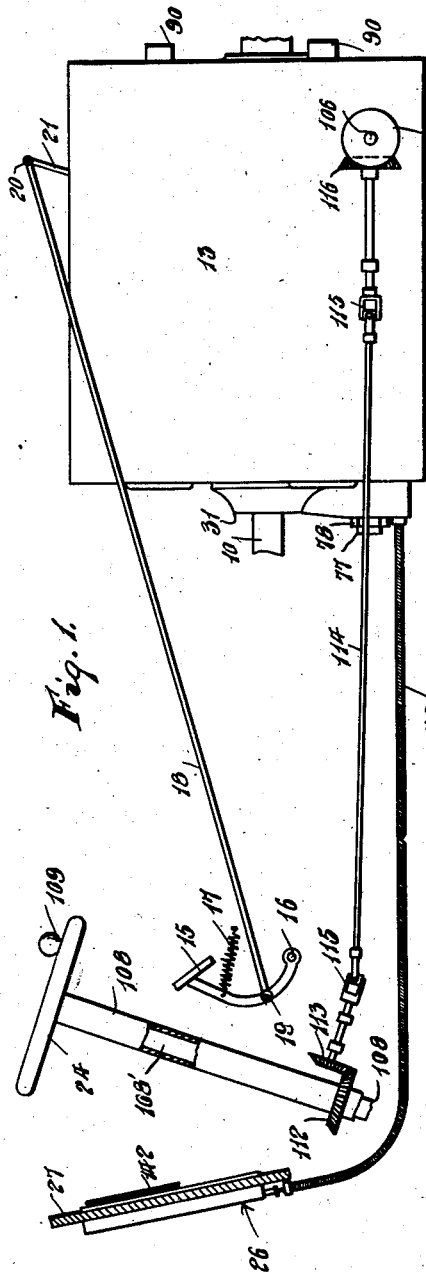
Figure 1 is a view in side elevation illustrating the improvement in connection with the steering wheel and instrument board of an automobile or other self-propelled vehicle.
Figure 3:
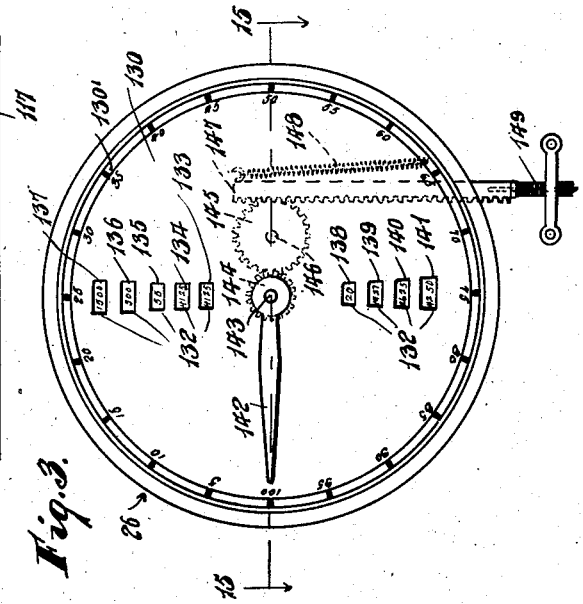
Figure 3 is a front elevation of the previously mentioned dashboard meter.
Figure 2:
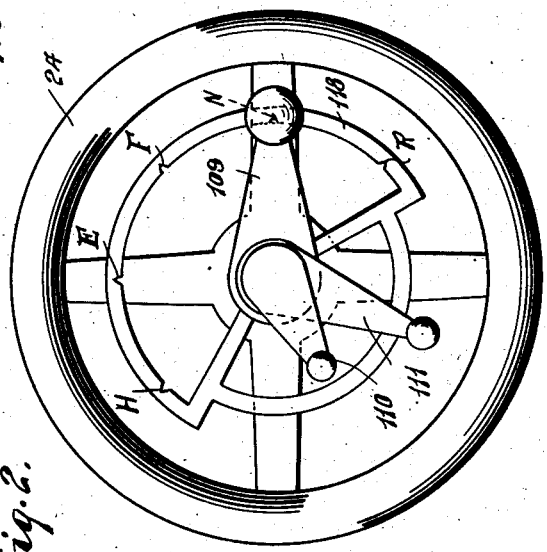
Figure 2 is a plan view of said steering wheel modified to practice the invention.
Figure 10:
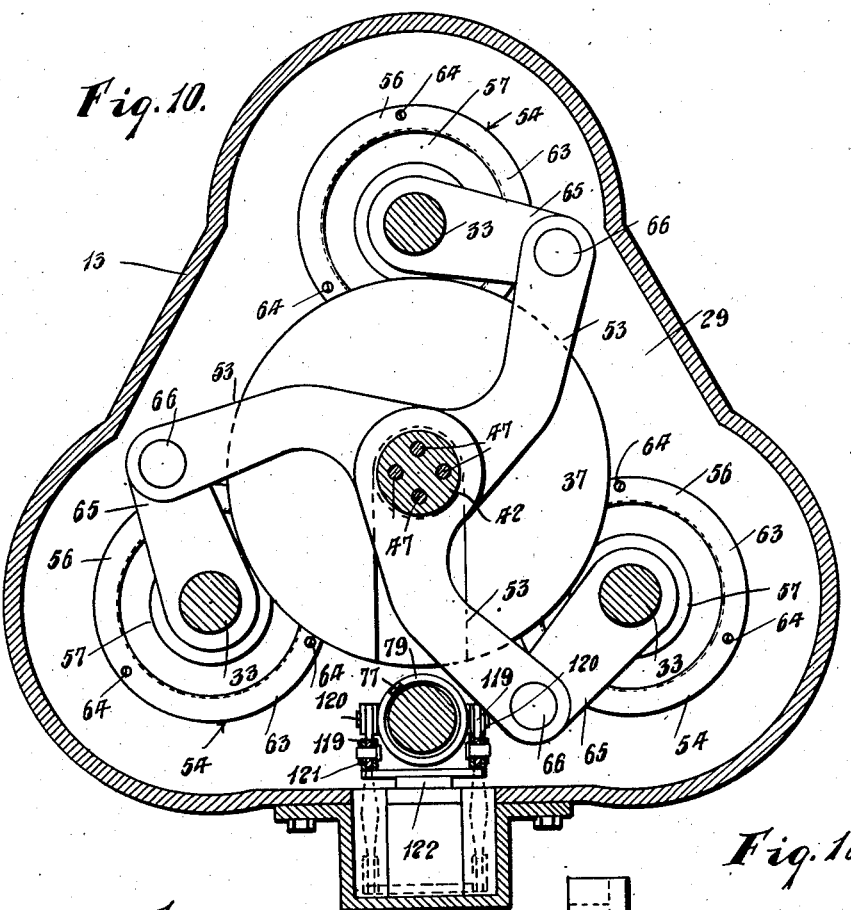
Figure 10 is a cross sectional view taken on the line 10—10 of Figure 4.
Figure 11:
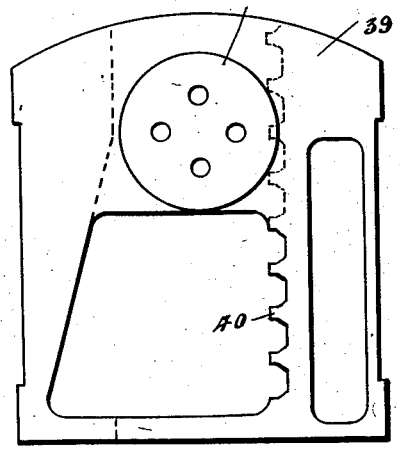
Figure 11 is a front elevation of one of the governors.
Figure 12:
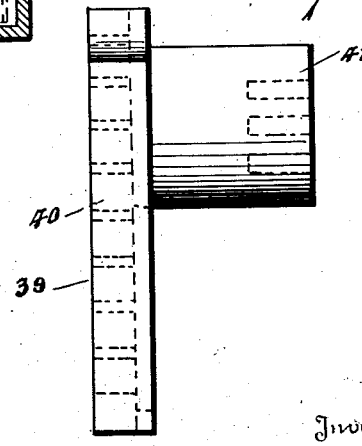
Figure 12 is a side elevation of the governor of Figure 11.
Figure 22:
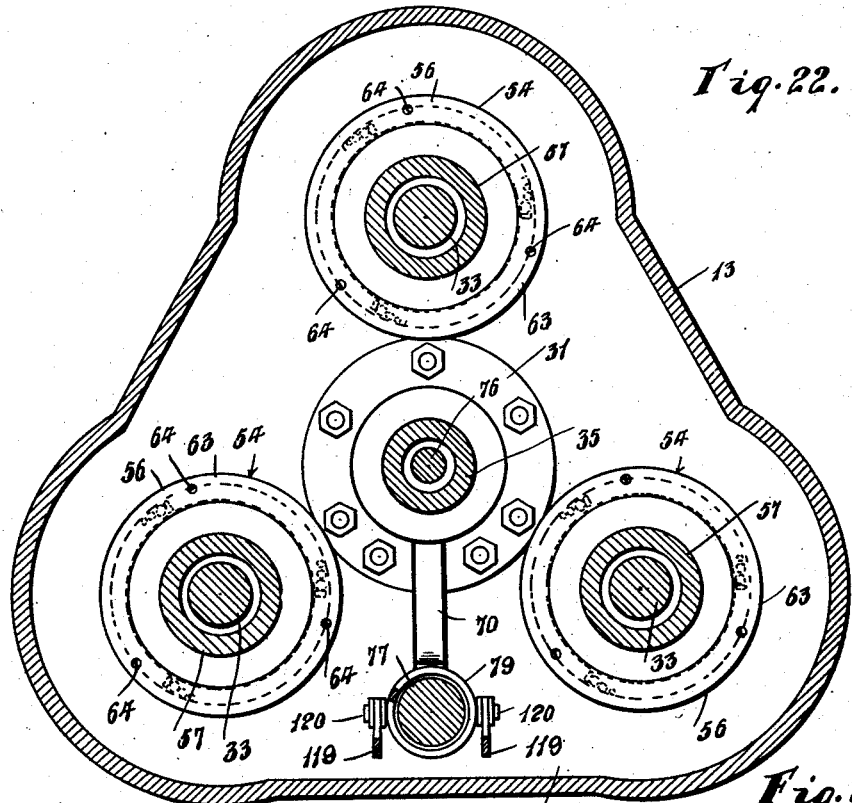
Figure 22 is a cross sectional view taken on the line 22—22 of Figure 4.
Figures 23, 24:
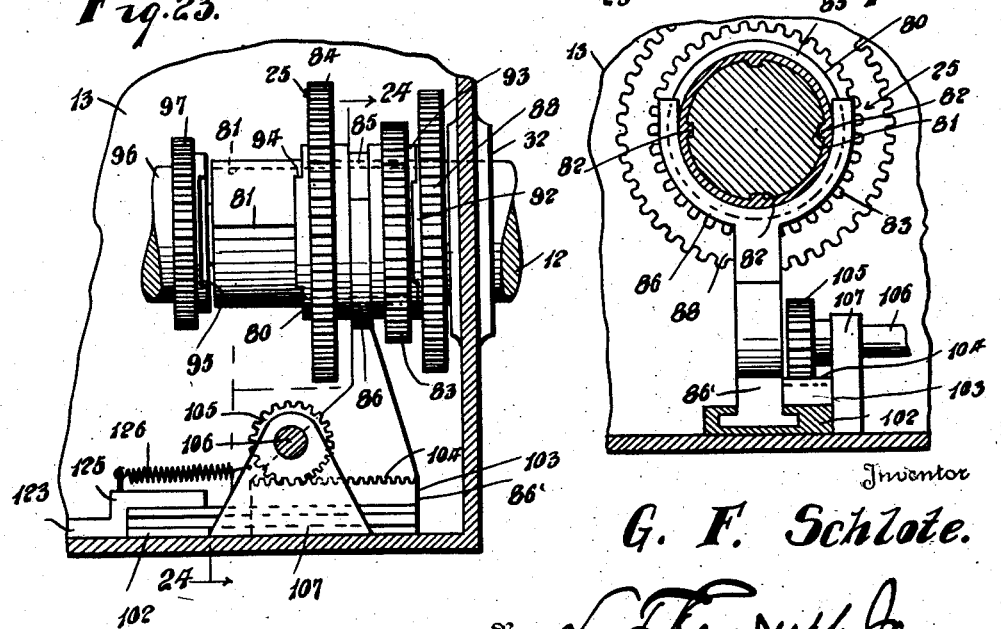
Figure 23 is an enlarged detail primarily being in section longitudinally through the casing adjacent the master gear.
Figure 24 is a cross sectional view taken on the line 24—24 of Figure 23.

Referring specifically to the drawings, wherein like reference characters designate like or similar parts, the device is shown as adapted for use on a self-propelled vehicle, although limitation to such use is not to be inferred. The propelling motor of the vehicle (not shown) has its crank shaft 10 connected in any suitable manner rigidly to the forward propeller shaft section 11 alined with a rear propeller shaft 12 which leads to the differential or rear wheel drive (not shown) of the vehicle. My improvement mainly contained within a housing or casing 13, supplants the use of the usual clutch and transmission used between the propelling motor and driven wheels of a self-propelled vehicle. After starting the propelling motor of the vehicle, through depression of the usual starter switch, or the use of a crank, for example, the operation is automatic except as hereinafter stated, and particularly with the exception of operating a gear unit 14 for arranging for reverse driving or emergency low speed, or equivalent driving, which is accomplished through the depression of a pedal 15, pivoted at 16 and normally held retracted by a spring 17, a link 18 being pivoted at 19 to said pedal and at 20 being pivoted to a lever 21 extending through an opening in the housing 13 and pivoted at 22 to the housing and having at 23 a yoke engaging the gear unit 14, as best shown in Figures 1 and 4. The steering wheel of the vehicle is shown at 24 and has means associated therewith as will be later specifically described, to control manually, the position of the master gear unit 25, thereby controlling the forward drive condition of the gearing, the reverse drive condition thereof, and neutral condition thereof. Connection is also made with operating parts whereby indicator mechanism 26 preferably located on the instrument board 27, indicates desirable data to the driver.

Said housing 13 may be of any desired shape and sectional construction. It preferably has a vertical partition 28 providing a forward compartment 29 and a rear compartment 30.

The forward shaft section is journaled in suitable bearing members 31 on the casing or housing 13 and the rear shaft section 12 is journaled in suitable bearing members 32 on said housing.

Disposed concentrically about the main propeller shaft sections 11 and 12, and equidistantly spaced, are three auxiliary propeller shafts 33, the same being journaled in suitable bearings 34 provided on the housing 13. Said shaft sections 33 extend the full length of the housing and across both chambers 29 and 30. Said forward shaft section 11 in fact is divided into separate sections 35 and 36. Within chamber 29 each propeller shaft member 35 and 36 has a fly wheel 37 rigid thereon. Each fly wheel is grooved as at 38 to accommodate radially slidable governors 39. Each governor has a row of rack or gear teeth at 40 in mesh with the teeth of a gear or pinion 41 keyed on the adjacent forward propeller shaft members 35 and 36.

Said governors have studs at 42 normally alined with the longitudinal axis of the propeller shaft section, and a coupling means 43 is provided for said studs in order to render the propeller shaft continuous. Said coupling 43 is of a flexible or partly universal nature and comprises a plate 44 secured by screws 45 to the stud 42 of propeller shaft member 35 and also a plate 46 secured as by screws 47 to the other stud 42. One plate has a dove-tail projection or rib 48 which is slidably interfitted in a correspondingly shaped groove 49 of the other plate. Contractile coil springs 50 are attached at their opposite ends to the plates 44 and 46, tending to urge registry or alinement of the studs.

It will be realized that the center of mass of each slide 39 (and parts 43 and 44) is above the axis of rotation of the drive shaft as seen in Figures 5 and 6, it being particularly noted that with a view to attaining this result, each slide 39 below the center of mass is cut away or of skeleton form.

On each stud 42, three links 53 are pivoted and such links coact with six overrunning clutch devices generally designated 54. Each overrunning clutch device comprises sections 56 and 57, the former being keyed as at 58 on the adjacent shaft 33. The companion section 57 extends into a recessed side of section 56 and is loose with respect to the adjacent shaft 33. The recess is enlarged to provide cam-shaped slots 59 in which a series of clutch members 60 are disposed, the same being urged toward the smaller ends of the slots by slidable followers 61 carried by section 56, and which followers are urged by expansive springs 62. A retaining plate 63 is screwed or otherwise fastened at 64 across the slots 59 to prevent displacement of the parts described therefrom. It will thus be seen that the clutches will operate in one direction only. Accordingly the section 57 and crank arms 65 thereon may assume different angles. The previously mentioned links 53 are pivotally connected at 66 to said crank arms 65 in order to adjust or vary the angularity of the overrunning clutch sections 57, according to the position of the governors 39, dependent on the speed of the motor.

As best shown in Figures 4 and 5, aided by the detail Figures 29 and 30, collars 67 are movable longitudinally along the propeller shaft members 35 and 36. These collars are provided in two sections bolted or secured together as at 68 and have annular grooves 69 which are engaged by fork members 70 adapted for longitudinal movement toward and away from each other. Said collars 67 also rotate with the propeller shaft members 35 and 36 since they have radial inwardly extending projections 71 passing through longitudinally elongated slots 72 in the shaft members 35 and 36 and entering recesses 73 in the peripheral wall of screw sleeves 74, held against rotation by the lugs 71, since the same and recesses 73 are preferably square in cross section. Sleeves 74 move longitudinally within bores or cut-away portions 75 of the propeller shaft members and have interior screw threads engaged by external screw threads of a screw or worm member 76 to which the pinions 41 are directly rigidly fastened or keyed. The collars are shown at their normal or outermost position in Figure 7.

Said fork members 70 are slidable toward and away from each other along a guide in the form of a tube or pipe 77 which is removably but rigidly secured to the housing 13 by ring nuts 78 screw-threaded on the guide and abutting adjacent parts of the housing. A relatively strong coil spring 79 surrounds the guide 76 and abuts fork members 70 being at rest or under tension, as desired in the normal position of Figure 5 but being adapted for compression and tensioning as the forks 70 move toward each other under outward movement of the governors and mechanism operated thereby, the tensioning of the spring 79, acting to separate said forks 70 upon decrease of the speed of the engine and return of the governors to normal position.

The previously mentioned master gear unit 25, best shown in Figures 4, 13, 23 and 24, comprises a hub 80 which rotates with the rear propeller shaft section 12 and in addition is slidable along the same by reason of the interfitting ribs 81 and 82, provided between the hub and shaft section 12. Said hub carries relatively smaller and larger gear members or teeth 83 and 84 and between them has an annular groove 85 engaged by a fork or yoke 86. When the vehicle wherein the transmission is employed, is traveling in a forward direction, gear 83 is enmeshed with gears 87 of similar size and keyed one to each of the auxiliary shafts 33.

A reverse gear 88 is loosely mounted on the propeller shaft section 12 and is enmeshed with intermediate gears 89 journaled on stub shaft 90 secured to one end wall of the housing 13. Said intermediate gears 89 mesh with reverse gears 91 keyed one to each of the auxiliary shafts 33. Said reverse gear 88 has a clutch rim 92 with which interfits the clutch rim or portion 93 on the hub 80, when the master gear 25 is at rearmost position, and in which position it will be noted from Figure 4, that gears 87 are disengaged with the forward drive gear 83. Also, when the gear 83 is enmeshed with the forward drive gears 87, clutch parts 92—93 for the reverse drive, are disengaged.

The emergency gear unit 14 with its gears 100 and 99 should mesh with their corresponding gears 97 and 84 only when master gear unit 25 is moved into position where clutch parts 94 and 95 are disengaged, thus leaving a small space between such clutch parts, as they have different numbers of revolutions per minute, when emergency gear unit 14 is engaged for use. Said clutch parts 94 and 95 are engaged only when a 100% high gear is desired to be engaged for straight drive. In that position the emergency gear unit 14 is disengaged from every gear.

The fork 86, operable to slide the master gear unit 25 has an elongated base 86' which is inverted T-shape in cross section at 101 and slidably mounted in a groove of a guide bracket 102, rigid on the bottom wall of the housing 13 in the compartment 30 thereof. Base 86' has a lateral rib 103 toothed at 104 on its upper surface, with which teeth a pinion or gear 105 is enmeshed, being carried by a shaft 106 journaled in a bearing 107 forming part of the bracket 102. Shaft 106 is disposed transversely of the housing 13 and extends laterally through and beyond one side wall thereof.

The aforesaid shaft 106 is operable intermediately from means located adjacent the steering wheel 24 of the vehicle, in order to dispose the master gear 25 in position for forward drive, reverse drive, and emergency forward drive. To this end, a rotatable sleeve 108 is journaled for rocking movement on the steering post 108', having an operating handle 109, thereby forming a lever. This lever 108—109 does not interfere with the adjacent spark and gas controls at 110 and 111, respectively. On the tube or sleeve 108, a bevel gear wheel 112 is keyed which meshes with a bevel gear wheel 113 of a suitably mounted and journaled shaft 114, equipped with universal joints 115 at appropriate locations, and carrying a bevel gear wheel 116 at its rear end, enmeshed with a bevel gear wheel 117 keyed to the shaft 106. The handle or control 109 is adapted to be swung to and occupy any one of five positions indicated by the letters R, N, F, E, and H of a frame 118 rigid on the steering wheel, any suitable means being provided, if desired, to latch or secure the control 109 in position registering with any or all of said notches.

In the emergency instances where drive is through the gears 100, 97, 99 and 84, the governors 39 are not permitted to operate. To this end, links 119 are pivoted at 120 to the forks 70, and pivotally connected together by a cross shaft 121 having a depending enlargement 122. The links 119 do not interfere with the normal operation of the parts. However a locking bar 123 is slidable along the base of the housing 13, guided through the partition 28 and a bracket 124. An L-shaped end 125 of said locking bar 123 overlaps and abuts the base 86' of fork 86, being maintained in that relation by a contractile coil spring 126 fastened at one end to the locking bar 123 and at its other end to bearing 107. As a result when the master gear unit 25 is shifted so that the gears 100, 97, 99 and 84 can engage, the locking bar 123 is moved by the base 86' beneath and in engagement with the enlargement 122, thereby preventing downward movement of the links 119, accordingly maintaining the forks 70 against movement.

Reverting to the indicating mechanism or meter 26 preferably carried on the instrument board 27 of the vehicle, it includes a relatively fixed face plate 130, marginally of which indications 130' are provided to proportionally express in percentage the ratio or number of revolutions per minute of the crank shaft of the motor to the number of revolutions per minute of the drive shaft or propeller shaft of the vehicle. Behind the plate 130, a disk 131 rotates having various figures or indications thereon for observation through slots 132 of the face plate 130. Such indications on the disk 131 may show, for example, brake horsepower at 133, miles per hour at 134, the percentage of ratio at 135, the revolutions of the rear wheels of the vehicle per minute at 136, and the revolutions of the motor per minute (various) at 137, the percentage of grade 138. the brake horsepower at 139, the revolutions of the motor maximum at 140 and the pound load at 141. An indicator 142 is movable over the dial face 130 and is rigidly connected with the disk 131 by means of a rivet or shaft 143 which is journaled in the face plate 130. Rigid with the shaft 143 is a pinion 144, enmeshed with a pinion 145 pivoted at 146 to the face plate 130. A slidable rack bar 147 has teeth enmeshed with those of the pinion 145 in order to actuate the pointer 142 and disk 131 unitarily relatively to the face plate. Bar 147 is normally maintained in and urged to normal position by a contractile spring 148 connected thereto and to the face plate 130. The bar 147 is actuated by any suitable Bowden wire or flexible shaft connection 149, passing through a sleeve 150 connected to the housing 13 and which connection or wire at 151 is attached to one of the yokes 70.

In the operation of the device, the propelling motor of the vehicle is started while the handle or lever 109 is in the neutral position N, the motor idling or being raced without any propelling effect on the vehicle, and hence the master gear unit 25 will be disengaged with all other gears. If such handle or lever 109 is moved to position F, the gears 83 and 87 are engaged, the motor and vehicle, as far as transmittal of speed or power is concerned are connected with each other, this position representing the forward drive with "free wheeling" and with unlimited control of the gear ratio. If said handle 109 is placed in position R, the clutch parts 92 and 93 are engaged and reverse gear 88 positively operated in order to operate the reverse gears 89 and 91. With said handle 109 in position E, the same result is obtained as at position N. If the handle 109 is in the position H, the result as far as transmittal of power or speed from the motor to the vehicle is concerned is the same as in self-propelled vehicles equipped with ordinary transmissions, in which ordinary transmissions the gear shift lever would have been placed in "high" and the clutch pedal left in its upper position, engaging the clutch whereby the motor would cease rotating due to this high gear ratio.

Assuming that the handle 109 is in the position F with the motor started, the speed of the motor is accelerated and this acceleration of speed causes an increased number of revolutions per minute of the crank shaft of the motor, including the two fly wheels 37, the vehicle gradually being moved forwardly. Upon increase of the speed of the fly wheel units 37, the governors 39 will be thrown outwardly by centrifugal force developed by the speed, the links 53 commencing to operate whereby their ends pivoted to the governors begin to rotate while their ends fastened to the parts 57 of the overrunning or free wheeling clutch unit begin to alternate, thereby slowly and gradually and firmly rotating or revolving the clutch parts 56 resulting in propelling the shaft 33 and parts geared therewith to drive rear shaft section 12 leading directly to the differential or through a universal joint connection in such differential. The parts gain speed in proportion to the revolutions per minute of the motor which is influenced and checked by the inertia of the car or load or other resistance in weight offered to power of the motor permitting governors 39 to move out of their normal or concentric position to the extent the inertia of the car permits. The same operation applies to the reverse motion, for which the handle 116 would be in the position R.

While the vehicle is in motion as just described, free wheeling is evident due to the provision of the overrunning clutch unit 54 and there is the additional feature that the vehicle can completely stand still while its motor may still idle, yet the handle 109 need not be removed from its position F due to the fact that the governors are forced back or returned to their normal or concentric position by the contraction of springs 50, the tension of which springs have considerably been increased and to such extent been increased that the centrifugal force having been decreased by a decrease in the speed of the motor is insufficient to force such expansion springs against its own expansion power. The normal or concentric position of the governors eliminates every motion of all connecting rods and parts 57 of all overrunning clutch units, while the other parts 56 of the overrunning clutch units, propeller shafts 33 and master gear 25 will still be in motion as long as the vehicle is coasting and when the vehicle has stopped moving, every part of the device is at a stand still with the exception of the two fly wheel units 37 and governors 38. It is accordingly possible that a certain predetermined number of revolutions of the motor are permissible before the vehicle needs to move, as the pressure of the expansion spring 79 can be made adjustable in any suitable manner.

Assuming that the vehicle is being driven up a steep grade with the handle or lever 109 in position F, and the driver intends to stop the vehicle, it will not be necessary to apply any brakes nor will it be necessary to shut off the ignition of the motor since the vehicle is automatically checked in that position wherever it happens to stop, while the motor still may idle due to the lowest gear ratio mathematically possible being applied between the motor and the vehicle, namely, unlimited revolutions per minute to nothing. It is thereby evident that this device offers an automatic check brake as the vehicle under the condition as just described is not permitted to roll backwards, although no other brakes whatsoever are applied thereto. Whenever the driver of the vehicle as just mentioned intends to continue to drive the vehicle up the grade as referred to, he merely steps on the accelerator and the engine will speed up, centrifugal force will be developed, the governors 38 will move outwardly, the links 53 will operate as well as the overrunning clutches, forward drive gears, master gear, all propeller shafts and rear wheels of the vehicle will be driven, whereby the vehicle will move as gradually or suddenly as the inertia thereof will permit.

In case the driver of the vehicle will have reached therewith a speed reasonably high enough for comfortable travel under most conditions, the governors 38 will have reached their extreme outer positions towards their concentric positions, at which position by means of the device the revolutions per minute of the motor will be the same as the revolutions per minute of the drive or propeller shaft in numbers, in which case the driver of the vehicle at his will may move said handle or lever 109 into position H without the necessity of any kind of a clutch whatever, thereby engaging clutch parts 94 and 95, establishing a connection eliminating the detour of power through the propeller shafts 33, and furnishing thereby a straight transmission of power in alinement with the geometrical centers of the crank shaft of the engine and all its extensions throughout the device.

Assuming that the vehicle is coasting down a steep grade, and the driver wishes to apply braking power toward the rear wheels of the vehicle by means of compression resistance of the motor, he may apply such compression brake by moving locked lever 109 into position H whereby due to the high differential ratio of three to one not much braking power is developed. He may also move said lever 109 into position E and through depression of the pedal 15 or other suitable means, cause gears 97 and 100, and gears 84 and 99 to enmesh, resulting in any desirable proportionate relationship of power to speed without the free wheeling feature, depending on the proportionate relationship in size and dimensions of the gears, the movement of the master gear unit 25 for the latter positioning of the gears, moving the locked bar 123 beneath the enlargement 122, serving to spread the links 119 and yokes 70, holding the parts normally movable under action of the governors 38, relatively immovable.

Various changes may be resorted to provided they fall within the spirit and scope of the invention.

I claim as my invention:—

1. In combination, a driven shaft, an auxiliary shaft, an overrunning clutch carried by the auxiliary shaft, centrifugal governor means operable by said driven shaft, means operatively connecting said governor means to said clutch, gearing to transmit power from said auxiliary shaft, a worm, means gearing said worm to said governor means, a sleeve threaded to the worm and movable axially through rotation of the worm, a yoke engaging the sleeve, and a spring engaging said yoke.

2. In combination, a driven shaft, a fly wheel on said shaft, centrifugal governor means slidable radially of said fly wheel having a stud and also having gear teeth, an auxiliary shaft having an overrunning clutch thereon, link means operatively connected to said overrunning clutch and pivoted on said stud, the first mentioned shaft having a hollow portion, a worm disposed in said hollow portion, a pinion on said worm in mesh with said gear teeth, a sleeve threaded to said worm, a collar slidable on the first mentioned shaft, said first mentioned shaft having a slot, a projection on the collar extending through said slot and engaging said sleeve, a yoke engaging the collar, and spring means engaging said yoke.

3. In combination, a driven shaft, a fly wheel on said shaft, centrifugal governor means slidable radially of said fly wheel having a stud and also having gear teeth, an auxiliary shaft having an overrunning clutch thereon, link means operatively connected to said overrunning clutch and pivoted on said stud, the first mentioned shaft having a hollow portion, a worm disposed in said hollow portion, a pinion on said worm in mesh with said gear teeth, a sleeve threaded to said worm, a collar slidable on the first mentioned shaft, said first mentioned shaft having a slot, a projection on the collar extending through said slot and engaging said sleeve, a yoke engaging the collar, spring means engaging the yoke, and return spring means engaging the governor means and tensioned through the outward movement of the governor means.

4. In combination, a driven shaft consisting of separate members, means flexibly coupling said members together, a fly wheel on each shaft member, auxiliary shafts disposed equidistantly about said driven shaft, overrunning clutch members on each auxiliary shaft, governor members carried by each fly wheel, link means pivoted to said governor members and to said clutch devices, and gearing to transmit power from the auxiliary shafts.

5. In combination, a driven shaft consisting of separate members, a fly wheel on each shaft member, auxiliary shafts disposed equidistantly about said driven shaft, overrunning clutch members on each auxiliary shaft, governor members carried by each fly wheel, link means pivoted to said governor members and to said clutch devices, gearing to transmit power from the auxiliary shafts, and a coupling means flexibly connecting the adjacent ends of the driven shaft members.

6. In combination, a driven shaft consisting of separate members, a fly wheel on each shaft member, auxiliary shafts disposed equidistantly about said driven shaft, overrunning clutch members on each auxiliary shaft, governor members carried by each fly wheel, link means pivoted to said governor members and to said clutch devices, gearing to transmit power from the auxiliary shafts, and a coupling means flexibly connecting the adjacent ends of the driven shaft members comprising a plate attached to each driven shaft end, said plate having radially arranged interfitting rib and recess, and spring means connected to both plates urging them toward normal position.

7. In combination, a driven shaft consisting of separate members, a fly wheel on each shaft member, auxiliary shafts disposed equidistantly about said driven shaft, overrunning clutch members on each auxiliary shaft, governor members carried by each fly wheel, link means pivoted to said governor members and to said clutch devices, gearing to transmit power from the auxiliary shafts, coupling means joining together the adjacent ends of said separate members, and return spring means engaging the governor means and tensioned through the outward movement of the governor means.

8. In combination, a driven shaft consisting of separate members, a fly wheel on each shaft member auxiliary shafts disposed equidistantly about said driven shaft, overrunning clutch members on each auxiliary shaft, governor members carried by each fly wheel, link means pivoted to said governor members and to said clutch devices, gearing to transmit power from the auxiliary shafts, coupling means joining together the adjacent ends of said separate members of the driven shaft, a guide member, a coil return spring about said guide member, yokes movable along the guide member to tension said spring, and mechanism connected to the governor means so that the outward movement of said governor means moves said yokes relatively to each other to tension said spring.

9. In combination, a driven shaft, an auxiliary shaft, an overrunning clutch carried by the auxiliary shaft, centrifugal governor means, means to operate said governor means from said driven shaft, means to operatively connect said centrifugal governor means to said clutch, propeller shaft sections alined with said driven shaft, a gear on the driven shaft, a master gear unit, gearing whereby said master gear unit will operate the shaft sections in forward and in reverse, means to clutch the master gear unit with the driven shaft, gearing to drive the auxiliary shaft from the gear unit in one position of the latter, and a shiftable gear unit to engage the first mentioned gear unit and a gear of said master gear unit to drive the shaft sections devoid of free wheeling.

10. In combination, a driven shaft, an auxiliary shaft, an overrunning clutch carried by the auxiliary shaft, centrifugal governor means, means to operate said governor means from said driven shaft, means to operatively connect said centrifugal governor means to said clutch, propeller shaft sections alined with said driven shaft, a gear on the driven shaft, a master gear unit, coacting gearing whereby said master gear unit will operate the shaft sections in forward and in reverse, means to clutch the master gear unit with the driven shaft, gearing to drive the auxiliary shaft from the gear unit in one position of the latter, a shiftable gear unit to engage the first mentioned gear unit and a gear of said master gear unit to drive the shaft sections devoid of free wheeling, spring means, mechanism operable to tension the spring means through the outward movement of said governor means, and means applicable through the movement of the master gear unit to engage and render said governor means inoperative.

11. In combination, a driven shaft, an auxiliary shaft, an overrunning clutch carried by the auxiliary shaft, centrifugal governor means, means to operate said governor means from said driven shaft, means to operatively connect said centrifugal governor means to said clutch, propeller shaft sections alined with said driven shaft, a gear on the driven shaft, a master gear unit, coacting gearing whereby said master gear unit will operate the shaft sections in forward and in reverse, means to clutch the master gear unit with the driven shaft, gearing to drive the auxiliary shaft from the gear unit in one position of the latter, a shiftable gear unit to engage the first mentioned gear unit and a gear of said master gear unit to drive the shaft sections devoid of free wheeling, a slidable yoke engaging said master gear unit provided with teeth, a pinion enmeshed with said teeth, a sleeve mounted for manual rotation, and shafting operable by said sleeve to turn said pinion to actuate said yoke and master gear unit.

12. In combination, a driven shaft consisting of separate front and rear members, means flexibly coupling said members together, a fly wheel on each shaft member, auxiliary shafts disposed equidistantly about said driven shaft, overrunning clutch members on each auxiliary shaft, governor members carried by each fly wheel, link means pivoted to said governor members and to said clutch devices, gearing to transmit power from the auxiliary shafts, yokes, means operable to move said yokes toward each other through the outward movement of the governor means, a return spring engaging said yokes compressed by said relative movement of the yokes, links connected to the yokes and to each other, intermeshing gearing connected between the auxiliary shafts and the rear shaft member, including a master gear operable for driving of the rear shaft member independently of said overrunning clutches, a yoke operable to move the master gear unit for the purpose last mentioned, and a bar movable by the last mentioned yoke into engagement with said links to prevent operation of said governor means.

13. In combination, a driven shaft, an auxiliary shaft, an overrunning clutch carried by the auxiliary shaft, centrifugal governor means operable by said driven shaft, means operatively connecting said centrifugal governor means to said clutch, gearing connected to and adapted to transmit power from said auxiliary shaft, a yoke, means operable through outward movement of the governor means to slide the yoke, and a return spring engaging said yoke and tensioned through the sliding movement of said yoke.

GUIDO F. SCHLOTE.